US012766441B2

(12) United States Patent
Larsson

(10) Patent No.: US 12,766,441 B2
(45) Date of Patent: Oct. 20, 2026

(54) METHOD AND A SEPARATION SYSTEM

(71) Applicant: Alfa Laval Corporate AB, Lund (SE)

(72) Inventor: Per-Gustaf Larsson, Huddinge (SE)

(73) Assignee: ALFA LAVAL CORPORATE AB, Lund (SE)

(*) Notice: Subject to any disclaimer, the term of this patent is extended or adjusted under 35 U.S.C. 154(b) by 294 days.

(21) Appl. No.: 18/724,748

(22) PCT Filed: Dec. 14, 2022

(86) PCT No.: PCT/EP2022/085881
§ 371 (c)(1),
(2) Date: Jun. 27, 2024

(87) PCT Pub. No.: WO2023/134950
PCT Pub. Date: Jul. 20, 2023

(65) Prior Publication Data

US 2025/0073617 A1 Mar. 6, 2025

(30) Foreign Application Priority Data

Jan. 13, 2022 (EP) .................................... 22151309

(51) Int. Cl.
*B04B 1/08* (2006.01)
*B01D 19/00* (2006.01)
(Continued)

(52) U.S. Cl.
CPC ..... *B01D 19/0052* (2013.01); *B01D 19/0068* (2013.01); *B01D 19/0073* (2013.01);
(Continued)

(58) Field of Classification Search
CPC ............ B01D 19/0052; B01D 19/0068; B01D 19/0073; B04B 11/02; B04B 13/00; B04B 1/08
(Continued)

(56) References Cited

U.S. PATENT DOCUMENTS 3,408,000 A 10/1968 Nilson
7,555,933 B2 7/2009 Dano
(Continued)

FOREIGN PATENT DOCUMENTS

WO WO 2015/181177 A1 12/2015
WO WO 2020/120358 A1 6/2020
(Continued)

OTHER PUBLICATIONS

International Search Report, issued in PCT/EP2022/085881, dated Apr. 13, 2023.
(Continued)

*Primary Examiner* — Frank M Lawrence, Jr.
(74) *Attorney, Agent, or Firm* — Birch, Stewart, Kolasch & Birch, LLP

(57) ABSTRACT

In a method for determining gas presence in a fluid system of a centrifugal separator including a rotatable assembly, the fluid system includes a separation space in the rotatable assembly, an inlet passage into the separation space, and at least a first outlet passage from the separation space. The method includes providing a feed liquid into the separation space, closing all outlet passages, supplying further feed liquid to the inlet passage, measuring a pressure increase interval within the fluid system, measuring a time period, and determining whether gas is present in the fluid system based on a result of the measuring steps.

20 Claims, 7 Drawing Sheets

(51) Int. Cl.
*B04B 11/00* (2006.01)
*B04B 13/00* (2006.01)

(52) U.S. Cl.
CPC ................ *B04B 1/08* (2013.01); *B04B 11/00* (2013.01); *B04B 13/00* (2013.01)

(58) Field of Classification Search
USPC .......... 95/1, 19, 241, 261, 270; 96/174, 216; 210/741, 784, 787, 512.1; 494/1, 2, 5, 494/10, 11
See application file for complete search history.

(56) References Cited

U.S. PATENT DOCUMENTS

| | | | | |
|---|---|---|---|---|
| 7,678,039 | B2 | 3/2010 | Åström | |
| 10,086,384 | B2 | 10/2018 | Thorwid et al. | |
| 2013/0017943 | A1 | 1/2013 | Toi et al. | |
| 2017/0203306 | A1 | 7/2017 | Penki et al. | |
| 2019/0210039 | A1* | 7/2019 | Kuhn | B04B 7/16 |
| 2023/0070550 | A1* | 3/2023 | Osman | B04B 1/08 |
| 2023/0099252 | A1* | 3/2023 | Larsson | B04B 1/08 73/861 |

FOREIGN PATENT DOCUMENTS

| | | | |
|---|---|---|---|
| WO | WO 2021/165137 | A1 | 8/2021 |
| WO | WO 2021/170486 | A1 | 9/2021 |

OTHER PUBLICATIONS

Written Opinion of the International Searching Authority, issued in PCT/EP2022/085881, dated Apr. 13, 2023.

* cited by examiner

METHOD AND A SEPARATION SYSTEM

TECHNICAL FIELD

The invention relates to a method for determining gas presence in a fluid system of a centrifugal separator. The invention further relates to a method for deaerating a centrifugal separator. Also, the invention relates to a separation system comprising a centrifugal separator and a control arrangement.

BACKGROUND

Centrifugal separators are generally used for separation of liquids and/or solids from a liquid mixture. During operation, a liquid mixture that is about to be separated is introduced into a rotating bowl of the centrifugal separator. Due to the centrifugal forces created in the rotating bowl, heavy particles and/or denser liquid, such as water, is separated at a periphery of the rotating bowl whereas less dense liquid is separated towards the rotational axis of the bowl. This allows for collection of the separated fractions, e.g. by means of different outlets arranged at the periphery and close to the rotational axis of the bowl, respectively.

The separation operation in fully hermetic centrifugal separators may be sensitive to air inside the rotating bowl. In some hermetic centrifugal separators, deaeration channels leading air from an inlet of the bowl to the outside of the bowl are used. However, the liquid mixture to be separated may escape through such deaeration channels when all air inside the bowl has been deaerate. This may thus lead to undesired leakage and product losses.

WO 2015/181177 discloses a separator for the centrifugal processing of a pharmaceutical product, such as a fermentation broth. The separator comprises a rotatable outer drum and an exchangeable inner drum arranged in the outer drum. The inner drum comprises means for clarifying the flowable product. The outer drum is driven via a drive spindle by a motor arranged below the outer drum. The inner drum extends vertically upwardly through the outer drum which fluid connections arranged at an upper end of the separator.

The separator is mechanically hermetically sealed. Neither means for deaerating the inner drum nor means for verifying that no air is trapped inside the inner drum are discussed in WO 2015/181177.

SUMMARY

It would be advantageous to ensure a reliable separation operation in a centrifugal separator. In particular, it would be desirable to enable determining whether a gas is trapped within a centrifugal separator. To better address one or more of these concerns, one or more methods and/or a centrifugal separator having the features defined in the independent claims is/are provided.

According to a first aspect of the invention, there is provided a method for determining gas presence in a fluid system of a centrifugal separator. The centrifugal separator comprises a stationary frame, a rotatable assembly, and a drive unit for rotating the rotatable assembly around a rotational axis. The fluid system comprises a separation space in the rotatable assembly, an inlet passage into the separation space, and at least a first outlet passage from the separation space. The method comprises steps of:

a) providing a feed liquid into the separation space,
b) closing all outlet passages from the separation space,
c) supplying further feed liquid to the inlet passage, d) measuring a pressure increase interval within the fluid system,
e) measuring a time period, and
f) determining whether gas is present in the fluid system based on a result of the measuring in steps d) and e).

Since the outlet passages from the separation space are closed in step b), which separation space has been provided with the feed liquid in step a), since further feed liquid is supplied to the inlet passage in step c), and since the pressure increase interval and the time period are measured in steps d) and e), the determining whether gas is present in accordance with step f) based on steps d) and e) is possible to be executed. An outlet passage may be an outlet passage for a phase separated from the feed. Thus, an outlet passage may be a liquid outlet passage.

As a result, a method for determining gas presence in a fluid system of a centrifugal separator is provided.

This aspect of the invention is based on the insight that a pressure within the fluid system will change in a different manner if a gas, such as air, is present in the fluid system of a centrifugal separator than if no gas is present in the fluid system. Accordingly, the inventor has realised that it is possible to determine whether gas is trapped within the fluid system of a centrifugal separator by closing the outlets of the fluid system and measure a pressure change over a time period within the fluid system while the pressure in the fluid system is increased by supplying further liquid to the fluid system.

A centrifugal separator may be subjected to one or more deaeration cycles prior to starting an actual separation task of a liquid mixture. Such a deaeration cycle is known and may involve providing a feed liquid to the fluid system of the separator and rotating the rotatable assembly at one or more different rotational speeds, while withdrawing or leading gas from the fluid system.

Step a) of the method may form part of a deaeration cycle.

The method provides for an automatic system that is able to detect whether gas is trapped within the fluid system of the centrifugal separator. The fluid system may not only include the separation space in the rotatable assembly but also conduits, etc. The positions of shut off devices in the fluid system, which are utilised for the closing in step b) determine the extension of the fluid system to be checked for presence of gas.

The method is advantageous in that it allows for determining whether the centrifugal separator is deaerated or not. This may be important e.g., in the separation of a liquid mixture in the form of a cell culture mixture, in that a lower pressure may be provided at the inlet for the cell culture mixture if the centrifugal separator is deaerated than if it is not deaerated. The lower pressure in turn is more gentle to the cells of the cell culture mixture than a higher pressure. Thus, the method provides a reduced risk of destroying cells while supplying the cell culture mixture to the separator to be separated therein.

In general, the invention is based around the realisation that; when all outlets of the centrifugal separator are closed and if gas is present within the fluid system, an increase in pressure will be slower than if no gas is present in the system, when liquid is supplied to the system.

This may be utilised in various variations of the steps of measuring, d) and e), and of determining, f), in accordance with different embodiments, as will be discussed herein.

The term "pressure increase interval" relates to a pressure increase step, an amount of increase in pressure, etc., within the fluid system. Accordingly, during the pressure increase interval, the pressure within the fluid system of the centrifugal separator has increased from a first pressure level to a second pressure level, the second pressure level being higher than the first pressure level.

The feed liquid provided into the separation space in step a) of the method may be a different liquid than the liquid mixture forming the process liquid to be separated in a subsequent separation operation with the centrifugal separator.

This may be the case when the liquid mixture is valuable, such as when the liquid mixture is a cell culture mixture. The cell culture mixture may for example comprise an expression of an extracellular biomolecule, such as an antibody, from a mammalian cell culture mixture. The extracellular biomolecule may be extracted from the separated light phase in subsequent process step/s. In other processes, cells of the cell culture mixture may be, or may contain, a sought-after substance. The cells or the sought-after substance may be extracted from the separated heavy phase in subsequent process step/s.

Accordingly, the centrifugal separator may be configured for use in the field of pharmaceuticals, biopharmaceuticals, and/or biotechnology. The centrifugal separator may form part of a set-up in a plant for the production of cells, such as CHO cells (Chinese Hamster Ovary cells) or other matter resulting from processes in the biotech industry.

For instance, the feed liquid may be a sterile liquid compatible with the cell culture mixture, such as a nutritional solution used in the cell culture mixture. The feed liquid may sometimes be referred to as priming liquid.

In other instances, the feed liquid provided into the separation space in step a) of the method may be the same liquid as the liquid mixture forming the process liquid to be separated in a subsequent separation operation with the centrifugal separator.

The step b), closing all outlet passages from the separation space, means that in embodiments comprising only the first outlet passage, the first outlet passage is closed. In embodiments comprising also a second outlet passage, also the second outlet passage is closed in strep b). In embodiments comprising further outlet passages also the further outlet passages are closed in step b).

According to a second aspect of the invention, there is provided a method for deaerating a centrifugal separator comprising steps of:

i) performing a deaeration cycle of the centrifugal separator, ii) performing the method for determining gas presence in a fluid system of the centrifugal separator according to any one of aspects and/or embodiments discussed herein, and either if step ii) comprises a result indicating gas presence in the fluid system, iii) repeating steps i) and ii), or if step ii) comprises a result indicating absence of gas in the fluid system, iv) stopping the deaeration cycle based on information obtained in step ii).

Since the method for determining gas presence in a fluid system of the centrifugal separator according to any one of aspects and/or embodiments discussed herein is used for determining whether deaeration of the centrifugal separator has been successful or requires to be repeated, a reliable subsequent separation operation may be ensured.

The method for deaerating may be performed at standstill of the centrifugal separator, i.e. when the rotatable assembly is not rotating around the rotational axis.

Alternatively, at least part of the method for deaerating may be performed during rotation of the rotatable assembly.

According to a third aspect of the invention, there is provided a separation system comprising a centrifugal separator and a control arrangement. The centrifugal separator comprises a stationary frame, a rotatable assembly, a drive unit for rotating the rotatable assembly around a rotational axis, and a fluid system. The fluid system comprises a separation space in the rotatable assembly, an inlet passage into the separation space, and at least a first outlet passage from the separation space. The control arrangement comprises a control unit, a feed pump connected to the inlet passage, at least a first regulating device connected at least to the first outlet passage, a pressure sensor arranged in fluid communication with the fluid system, and a timer. The control arrangement is configured to:

a) provide a feed liquid into the separation space utilising the feed pump, b) close all outlet passages utilising at least the first regulating device, c) supply further feed liquid to the inlet passage utilising the feed pump, d) measure a pressure increase interval within the fluid system utilising the pressure sensor, e) measure a time period utilising the timer, and f) determine whether gas is present in the fluid system based on the measured pressure increase interval and the measured time period.

As a result, a separation system configured for determining gas presence in the fluid system of a centrifugal separator is provided.

The control unit may comprise one or more computer programs configured for performing one or both of the above discussed methods and/or embodiments thereof. The control unit may comprise a processor and communication interface for communicating with the feed pump, the first and second regulating devices and the pressure sensor.

For this purpose, the control unit may comprise a device having processing capability in the form of processing unit, such as a central processing unit, which is configured to execute computer code instructions which for instance may be stored on a memory. The processing unit may alternatively be in the form of a hardware component.

The centrifugal separator used in the different aspects and/or embodiments of the invention may be the same centrifugal separator. Thus, the features discussed in relation to the centrifugal separator in the third aspect of the invention may be features of the centrifugal separator in both the first and second aspects of the invention.

The stationary frame of the centrifugal separator is a non-rotating part, and the rotatable assembly is supported by the frame, e.g. by means of at least one ball bearing.

The drive unit is arranged for rotating the rotatable assembly and may comprise an electrical motor directly connected to the rotatable assembly, or it may be arranged to rotate the rotatable assembly by a suitable transmission, such as a belt or a gear transmission.

The rotatable assembly comprises a rotor casing in which the separation takes place. The rotor casing encloses the separation space, in which the separation of a liquid mixture, such as e.g. a cell culture mixture, takes place.

The rotatable assembly may alternatively be referred to as rotor.

According to some embodiments of the methods, the fluid system may comprise a second outlet passage from the separation space.

According to some embodiments of the separation system, the fluid system may comprise a second outlet passage from the separation space. The control arrangement may comprise a second regulating device connected to the second outlet passage. The control arrangement may be further configured to: b1) close the first and second outlet passages utilising the first and second regulating devices, respectively.

The rotor casing may be a solid rotor casing and be free of any further outlets for separated phases from the separation space than the first and second outlet passages. Thus, the solid rotor casing may be solid in that it is free of any peripheral ports for discharging e.g. a sludge phase accumulated at the periphery of the separation space.

However, in alternative embodiments, the rotor casing may comprise peripheral ports for intermittent or continuous discharge of a separated phase, such as a sludge phase, from the periphery of the separation space.

For instance, this may be the case in embodiments comprising the first outlet passage but not the second outlet passage.

In the separation space of the rotatable assembly, during use of the centrifugal separator, a liquid mixture is separated at least into a liquid heavy phase, also referred to as heavy phase and a liquid light phase, also referred to as light phase. The liquid mixture is a process fluid that is to be separated in an actual separation process to be performed in the centrifugal separator once deaeration of the centrifugal separator and/or determining in accordance with the present method has been performed.

During use of the centrifugal separator, the inlet passage is configured to lead the liquid mixture into the separation space. During use of the centrifugal separator, the first and second outlet passages from the separation space are configured to lead the respective heavy and light phases out of the separation space.

In the separation space there may be arranged a separation aid, such as a stack of separation discs arranged concentrically with the rotational axis.

The stack may comprise frustoconical separation discs. The separation discs may thus have a frustoconical shape, which refers to a shape having the shape of a frustum of a cone, which is the shape of a cone with the narrow end, or tip, removed. A frustoconical shape has thus an imaginary apex where the tip or apex of the corresponding conical shape is located. The axis of the frustoconical shape is axially aligned with the rotational axis of the rotor casing.

Alternatively, the separation aid may comprise axial discs arranged around the axis of rotation.

The separation discs may e.g. comprise a metal or be of metal material, such as stainless steel. The separation discs may further comprise a plastic material or be of a plastic material.

Accordingly, according to embodiments, the inlet passage may be configured for supply of a liquid mixture to be separated, the first outlet passage may be configured for discharge of a separated liquid phase, and the second outlet passage may be configured for discharge of a heavy phase having a density that is higher than the separated liquid phase. Further, the rotatable assembly may comprise a rotor casing enclosing the separation space and a stack of separation discs arranged in the separation space.

According to embodiments, the step f) may comprise a step of:

f1) determining whether gas is present in the fluid system based on a result of the measuring of a length of the time period, in accordance with step e), required for establishing a predetermined pressure increase interval, determined in the measuring in accordance with step d). In this manner, determining whether gas is present in the fluid system may be based on the time period required to achieve a predetermined pressure increase.

According to embodiments of the method, if the length of the time period exceeds a predetermined length, then step f1) may comprise determining presence of gas in the fluid system, and wherein if the length of the time period is below the predetermined length, then step f1) may comprise determining absence of gas in the fluid system. In this manner, a limit value in the form of a predetermined length of the time period may be utilised for determining whether gas is present in the fluid system.

Accordingly, an easily implemented method for determining gas presence in a fluid system of a centrifugal separator may be provided.

Similarly, when applied in the control arrangement of the separation system, the control arrangement may easily be set to determine whether gas is present in a fluid system of the centrifugal separator. Moreover, the control arrangement may easily be adjusted by changing the predetermined length of the time period.

According to embodiments, the step f) may comprise a step of:

f2) determining whether gas is present in the fluid system is based on a result of the measuring of a value of the pressure increase interval, in accordance with step d) over a fixed time period measured in accordance with step e). In this manner, determining whether gas is present in the fluid system may be based on the actual pressure increase achieved over the fixed time period.

According to embodiments of the method, if the value of the pressure increase interval is below a predetermined value, then step f2) may comprise determining presence of gas in the fluid system, and wherein if the value of the pressure increase interval exceeds the predetermined value, then step f2) may comprise determining absence of gas in the fluid system. In this manner, a limit value in the form of a predetermined pressure increase may be utilised for determining whether gas is present in the fluid system.

Accordingly, an easily implemented method for determining gas presence in a fluid system of a centrifugal separator may be provided.

Similarly, when applied in the control arrangement of the separation system, the control arrangement may easily be set to determine whether gas is present in a fluid system of the centrifugal separator. Moreover, the control arrangement may easily be adjusted by changing the predetermined value of the pressure increase.

According to embodiments, the supplying of step c) may comprise pumping further feed liquid into the inlet passage. In this manner, it may be ensured that a steady supply of fluid is provided in step c).

Moreover, a pump may be devised, or may be set, to provide liquid at a certain pressure. The certain pressure may be utilised with the outlet passages closed for causing pressure increase in the fluid system during measuring in accordance with steps d) and e).

According to embodiments, the centrifugal separator may be free of any deaeration channels arranged for leading out gas from the inlet passage to outside the rotatable assembly or to the at least first outlet passage or to the second outlet passage in embodiments comprising the second outlet passage.

Thus, the centrifugal separator may be free of any deaeration channels arranged for guiding air from the inlet passage to outside the rotatable assembly and free of any deaeration channels to any outlet passage, i.e. to the light phase outlet and/or to the heavy phase outlet.

A centrifugal separator being free of deaeration channels may be advantageous when processing cell culture mixtures in the centrifugal separator for instance, since product loss during operation of the centrifugal separator may be avoided.

According to embodiments, the rotatable assembly may comprise an exchangeable separation insert and a rotatable member, the exchangeable separation insert comprising the rotor casing and being supported by the rotatable member.

The exchangeable separation insert may thus be a pre-assembled insert being mounted into the rotatable member, which may function as a rotatable support for the insert. The exchangeable insert may thus easily be inserted and disengaged from the rotatable member as a single unit.

According to embodiments, the exchangeable separation insert may be a single use separation insert. Thus, the insert may be adapted for single use and be a disposable insert. The exchangeable insert thus, may be configured for processing of one product batch, such as a single product batch in the pharmaceutical industry, and then be disposed.

The exchangeable separation insert may comprise a polymeric material or consist of a polymeric material. As an example, the rotor casing and the stack of separation discs may comprise, or be of a polymeric material, such as polypropylene, platinum cured silicone or BPA free polycarbonate. The polymer parts of the insert may be injection moulded. However, the exchangeable separation insert may also comprise metal parts, such as stainless steel parts.

For example, the stack of separation discs may comprise discs of stainless steel.

The exchangeable insert may be provided as a sealed sterile unit to be mounted in the rotatable member.

According to embodiments, the inlet passage and the at least first outlet passage may be mechanically hermetically sealed. In embodiments comprising the second outlet passage, also the second outlet passage may be mechanically hermetically sealed. In this manner, a hermetic centrifugal separator may be provided.

In the fluid system of a hermetic centrifugal separator a pressure may be increased by supplying feed liquid to the inlet passage while the first outlet passage and any further outlet passage/s are closed.

More specifically, a mechanical hermetical seal refers to a seal that provides a gas tight seal between a stationary portion of the centrifugal separator, such as a conduit for transporting liquid mixture to be separated or a separated liquid phase, and the rotatable assembly. Inter alia in this manner, gas from outside the rotor assembly may be prevented from contaminating the liquid mixture and/or the separated phases.

Also, in this manner, during operation of the separation system, the separation space and/or the fluid system may be arranged to be completely filled with liquid, such as a cell culture mixture and therefrom separated phases. This means that no air or free liquid surfaces is present in the separation space during operation.

A mechanically hermetically sealed inlet is configured for receiving the fluid mixture to be separated and to guide the fluid to the separation space. Also the at least first outlet passage and any further outlet passage or passages may be mechanically hermetically sealed.

According to embodiments, the inlet passage may lead into the separation space at a first axial end of the rotatable assembly and may be arranged such that the liquid mixture to be separated enters said rotor casing at the rotational axis. The mechanically hermetically sealed first outlet passage for discharge of the separated light phase may lead from the lower axial end or from the upper axial end of the rotatable assembly.

Further, if present in the centrifugal separator, the second outlet passage may lead from the separation space at a second axial end of rotatable assembly opposite the first axial end and may be arranged such that the separated heavy phase is discharged at the rotational axis. Thus, the mechanically hermetically sealed inlet passage may lead to a first axial end, such as the lower axial end, of the rotatable assembly whereas the mechanically hermetically sealed second outlet passage may lead from the opposite axial end, such as the upper axial end, of the rotatable assembly.

The arrangement of the inlet passage and the second outlet passage lead to and from, respectively, the separation space at the rotational axis may be advantageous if the liquid mixture to be separated is e.g., a cell culture mixture. This imparts less rotational energy for on the cells as they enter and leave the separation space and thus decreases the risk of cell breakage.

According to embodiments, the method for determining gas presence in a fluid system of a centrifugal separator may be performed during standstill of the rotatable assembly.

According to alternative embodiments, the method for determining gas presence in a fluid system of a centrifugal separator may be performed during rotation of the rotatable assembly.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
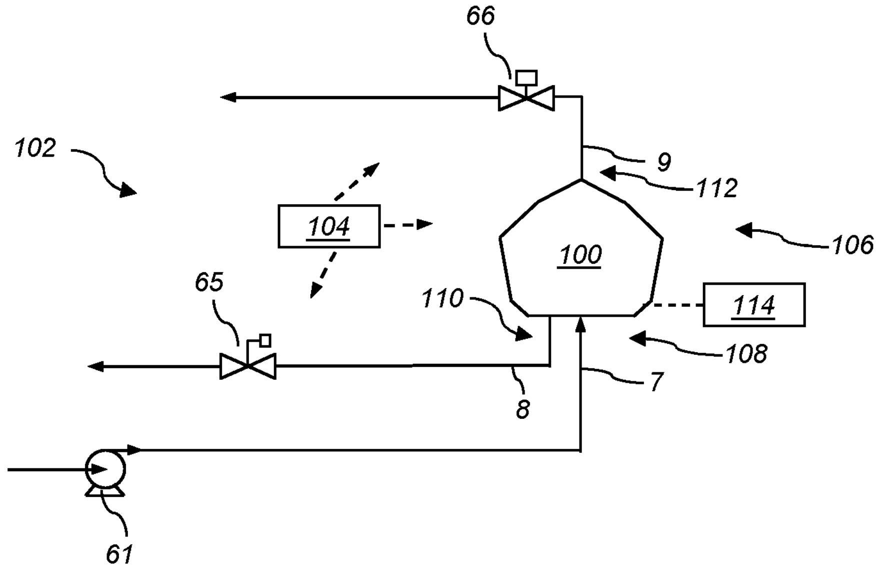
FIG. 1 schematically illustrates a separation system of the present disclosure in which a method for determining gas presence in a fluid system of a centrifugal separator may be performed.

FIG. 1 schematically illustrates a separation system 102 according to embodiments. In the separation system 102, a method for determining gas presence in a fluid system of a centrifugal separator as discussed herein may be performed. Also, a method for deaerating a centrifugal separator as discussed herein may be performed in the separation system 102.

The separation system 102 comprises a centrifugal separator 100 and a control arrangement, generally indicated with reference number 104.

The centrifugal separator 100 may be a centrifugal separator 100 as discussed below with reference to FIGS. 3-6.

The centrifugal separator 100 comprises a stationary frame, a rotatable assembly, a drive unit for rotating the rotatable assembly around a rotational axis, and a fluid system, generally indicated with reference number 106.

The fluid system 106 comprises a separation space in the rotatable assembly, an inlet passage 108 into the separation space, and a first outlet passage 110 and a second outlet passage 112 from the separation space.

Embodiments comprising at least a first outlet passage 110 from the separation space are also envisaged.

The fluid system 106 is also discussed below with reference to FIGS. 3-6.

The control arrangement 104 comprises a control unit, a feed pump 61 connected to the inlet passage 108, a first regulating device 65 connected to the first outlet passage 110, and a second regulating device 66 connected to the second outlet passage 112, a pressure sensor 114 arranged in fluid communication with the fluid system 106, and a timer.

The pressure sensor 114 may be arranged in connection with one of the inlet or outlet passages 108, 110, 112.

The fluid system 106 may be limited by the feed pump 61, the first regulating device 65, and the second regulating device 66.

The control arrangement 104 is further discussed below with reference to FIG. 2.

During separation in the centrifugal separator 100, a liquid mixture to be separated is supplied to the separation space via a stationary inlet conduit 7 by means of the feed pump 61. The stationary inlet conduit 7 forms part of the inlet passage 108. After separation within the separation space of the rotatable assembly, separated light phase is discharged via a stationary first outlet conduit 8, whereas separated heavy phase is discharged via a stationary second outlet conduit 9. The stationary first and second outlet conduits 8, 9 form part of the first outlet passage 110 and the second outlet passage 112, respectively.

During deaeration of the centrifugal separator 100 and its fluid system 106 and/or during determining whether gas is present in the fluid system 106, a feed liquid, which may the same liquid as the liquid mixture to be separated or a different liquid than the liquid mixture, such as a priming liquid, is supplied to the separation space. The feed liquid need not be separated into light and heavy phases during deaeration and/or during determining whether gas is present.

The first regulating device 65 is arranged downstream of the first outlet passage 110. In these embodiments, the first regulating device 65 is illustrated in the form of a regulating valve. Alternatively, the first regulating device 65 may be e.g. a pump, such as a peristaltic pump. As long as the first regulating device 65 is arranged for opening and closing the first outlet passage 110, the first regulating device 65 may take any suitable form. Thus, the first regulating device 65 may be arranged for regulating a flow in the first outlet passage 110 and in the stationary first outlet conduit 8.

Downstream of the second outlet passage 112, the second regulating device 66 is arranged. In these embodiments, the second regulating device 66 is illustrated in the form of a regulating valve. Alternatively, the second regulating device 66 may be e.g. a pump, such as a peristaltic pump. As long as the second regulating device 66 is arranged for opening and closing the second outlet passage 112, the second regulating device 66 may take any suitable form. Thus, the second regulating device 66 may be arranged for regulating the flow in the second outlet passage 112 and in the stationary second outlet conduit 9.

Figure 2:
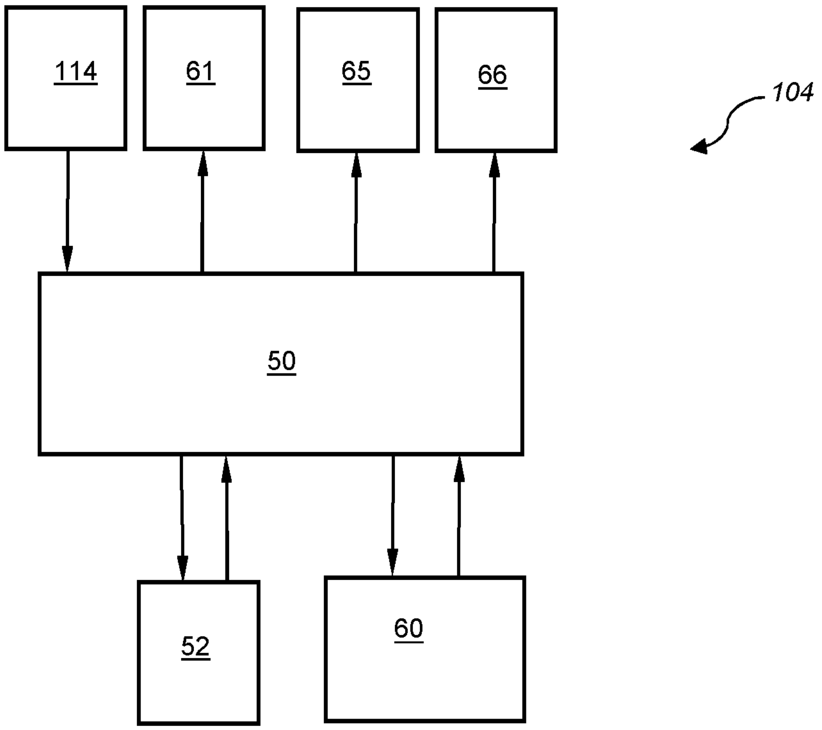
FIG. 2 illustrates a control arrangement according to embodiments.

FIG. 2 illustrates a control arrangement 104 according to embodiments. The control arrangement 104 is configured to be utilised in connection with different aspects and/or embodiments of the invention. Inter alia, the control arrangement 104 forms part of a separation system as discussed herein and illustrated e.g., in FIG. 1.

The control arrangement 104 comprises a control unit 50 which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression control unit may represent a processing circuitry comprising a plurality of processing circuits, such as, e.g., any, some or all of the ones mentioned above.

The control arrangement 104 may comprises a memory unit 60. The control unit 50 is connected to the memory unit 60, which provides the control unit 50 with, for example, stored programme code and/or stored data which the control unit 50 needs to enable it to do calculations. The control unit 50 may also be adapted to storing partial or final results of calculations in the memory unit 60. The memory unit 60 may comprise a physical device utilised to store data or programs, i.e., sequences of instructions, on a temporary or permanent basis.

The control arrangement 104 further comprises a feed pump 61 connected to an inlet passage of a centrifugal separator, a first regulating device 65 connected to a first outlet passage of the centrifugal separator, and a second regulating device 66 connected to a second outlet passage of the centrifugal separator, a pressure sensor 114 arranged in fluid communication with a fluid system of the centrifugal separator, and a timer 52.

The control unit 50 communicates with the pump 61 and regulating devices 65, 66 via one or more from among a cable, a data bus, e.g. a CAN (controller area network) bus, a MOST (media orientated systems transport) bus or some other bus configuration, or a wireless connection. The control unit 50 may communicate in a similar manner with the timer 52. Alternatively, the timer 52 may form part of, or may be a function or process in, the control unit 50.

In the embodiment depicted, only one control unit 50 and memory 60 are shown, but the control arrangement 104 may alternatively comprise more than one control unit and/or memory.

The control arrangement 104 may be configured to perform a method 200 for determining gas presence in a fluid system 106 of a centrifugal separator 100 according to any one of aspects and/or embodiments discussed herein, see e.g. below with reference to FIG. 8.

The control arrangement 104 may be configured to perform a method 300 for deaerating a centrifugal separator 100 according to any one of aspects and/or embodiments discussed herein, see e.g. below with reference to FIG. 9.

With reference to FIGS. 1 and 2, the control arrangement 104 is configured for determining whether gas is present in the fluid system 106 of the centrifugal separator 100.

More specifically, the control arrangement 104 is configured to:

a) Provide a feed liquid into the separation space utilising the feed pump 61.

b) Close all outlet passages 110, 112 from the separation space 17 utilising at least the first regulating device 65. This may comprise b1) close the first and second outlet passages 110, 112 utilising the first and second regulating devices 65, 66, respectively.
c) Supply further feed liquid to the inlet passage 108 utilising the feed pump 61.
d) Measure a pressure increase interval within the fluid system 106 utilising the pressure sensor 114.
e) Measure a time period utilising the timer 52.
f) Determine whether gas is present in the fluid system based on the measured pressure increase interval in d) and the measured time period in e).

That is, to determine in accordance with f) whether gas is present within the fluid system 106 is based on a relationship between the pressure increase in the fluid system 106 and time.

Accordingly, when determining if a gas, such as air, is present within the fluid system 106 of the centrifugal separator 100, the first and second outlet passages 110, 112 are closed by closing the first and second regulating devices 65, 66. While the feed pump 61 supplies feed liquid to the inlet passage 108, the pressure in the fluid system 106 is measured with the pressure sensor 114.

As discussed below with reference to FIG. 8 and the method 200 for determining gas presence in a fluid system of a centrifugal separator, f) may be performed in two principal ways, either based on a measurement of the time period required to achieve a predetermined increase in pressure or based on measurement of the pressure increase achieve over a fixed time period.

Accordingly, the control arrangement 104 may further be configured to perform one or more of the steps f1)-g2) discussed below with reference to FIG. 8 and the method 200 for determining gas presence in a fluid system of a centrifugal separator.

FIGS. 3-6 show in more detail example embodiments of centrifugal separators 100 in which the methods of the present disclosure may be implemented. The methods may be a method 200, and its embodiments, for determining gas presence in a fluid system 106 of a centrifugal separator 100 as discussed inter alia with referent to FIG. 8 and a method 300 for deaerating a centrifugal separator 100 as discussed inter alia with referent to FIG. 9. The centrifugal separator 100 may be a centrifugal separator 100 as discussed above with reference to FIG. 1 including a control arrangement 104 as discussed with reference to FIGS. 1 and 2. Accordingly, in the following reference is also made to FIGS. 1 and 2.

Generally, with reference to FIGS. 3-6, and as discussed in part above with reference to FIGS. 1 and 2, the centrifugal separator 100 comprises a stationary frame 30, a rotatable assembly 35, a drive unit 34 for rotating the rotatable assembly 35 around a rotational axis (X), and a fluid system 106.

The fluid system 106 comprises a separation space 17 in the rotatable assembly 35, an inlet passage 108 into the separation space 17, and a first outlet passage 110 and a second outlet passage 112 from the separation space 17.

The rotatable assembly 35 comprises a rotor casing 2 enclosing the separation space 17 and a stack 19 of separation discs 20 arranged in the separation space 17. In this manner, a separation aid may be provided in the separation space 17. Other separation aids than separation discs may alternatively be used.

The control arrangement comprises a control unit (not shown), a feed pump (not shown) connected to the inlet passage 108, a first regulating device (not shown) connected to the first outlet passage 110, and a second regulating device (not shown) connected to the second outlet passage 112, a pressure sensor (not shown) arranged in fluid communication with the fluid system 106, and a timer (not shown).

During use of the centrifugal separator 100, the inlet passage 108 is configured for supply of a liquid mixture to be separated, the first outlet passage 110 is configured for discharge of a separated liquid phase, and the second outlet passage 112 is configured for discharge of a heavy phase having a density that is higher than the separated liquid phase.

However, as discussed herein, during deaeration of the centrifugal separator 100 and during determining presence of gas in the fluid system 106 may be performed with a feed liquid that is a different liquid than the liquid mixture separated during use of the separation system and the centrifugal separator 100.

The inlet passage 108 and the first and second outlet passages 110, 112 are mechanically hermetically sealed.

According to embodiments, the centrifugal separator 100 may be free of any deaeration channels arranged for leading out gas from the inlet passage to outside the rotatable assembly or to the first or second outlet passage 110, 112, or to an at least first outlet passage 110. In this manner, no liquid mixture from within the separation space 17 may escape via such deaeration channels.

Figure 3:
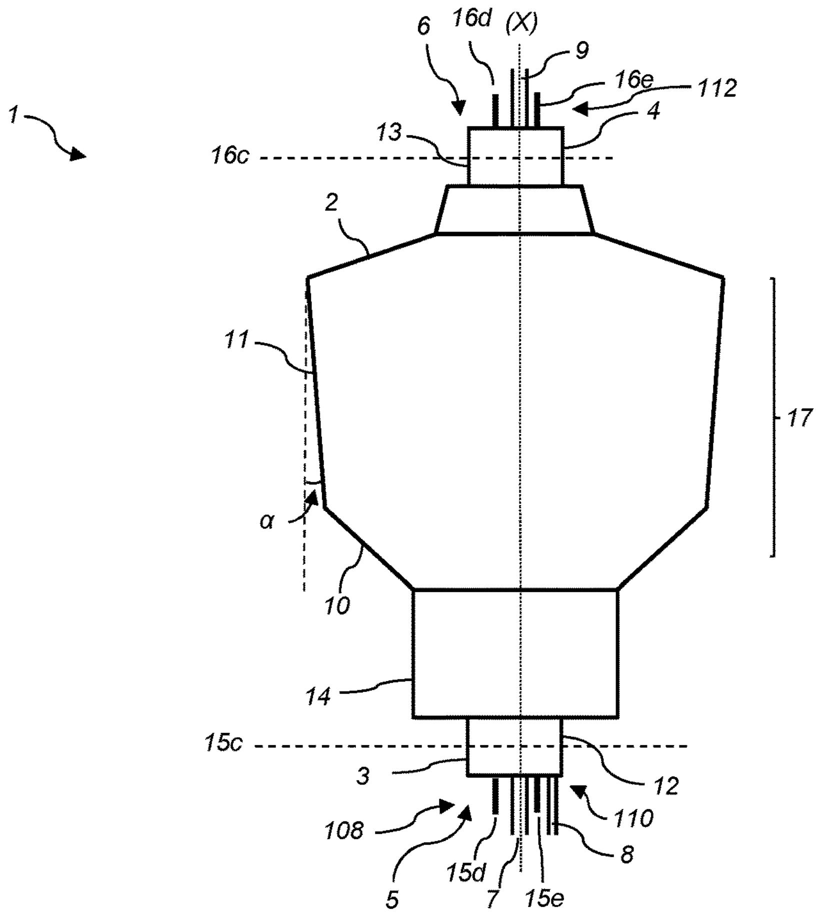
FIGS. 3-6 show embodiments of centrifugal separators.

FIG. 3 schematically shows an outer side view of an exchangeable separation insert 1 that may be used in a centrifugal separator 100 of the present disclosure. The exchangeable separation insert 1 comprises a rotor casing 2 of the rotatable assembly of the centrifugal separator 100.

More specifically, the rotatable assembly 35 comprises an exchangeable separation insert 1 and a rotatable member 31. The exchangeable separation insert 1 comprises the rotor casing 2 and is supported by the rotatable member 31, see also FIG. 4.

The insert 1 comprises the rotor casing 2 arranged between a first, lower stationary portion 3 and a second, upper stationary portion 4, as seen in the axial direction defined by a rotational axis (X). During use of the insert 1 in a centrifugal separator, the first stationary portion 3 is arranged at the lower axial end 5 of the insert 1, whereas the second stationary portion 4 is arranged at the upper axial end 6 of the insert 1.

The inlet passage 108 is in this example arranged at the axial lower end 5, and the feed liquid and liquid mixture is supplied via a stationary inlet conduit 7 arranged in the first stationary portion 3. The stationary inlet conduit 7 is arranged at the rotational axis (X). The first stationary portion 3 further comprises the stationary first outlet conduit 8 for the separated liquid phase of lower density, also called light phase. Accordingly, the first outlet passage 110 is arranged at the lower axial end 5.

There is further the stationary second outlet conduit 8 arranged at the upper stationary portion 4 for discharge of the separated phase of higher density, also called heavy phase. Accordingly, the second outlet passage 112 is arranged at the upper axial end 5.

Thus, in this embodiment, during use of the centrifugal separator 100, the liquid mixture is supplied via the lower axial end 5, the light phase is discharged via the lower axial end 5, whereas the heavy phase is discharged via the upper axial end 6.

The outer surface of the rotor casing 2 comprises a first 10 and second 11 frustoconical portion. The first frustoconical portion 10 is arranged axially below the second frustoconical portion 11. The outer surface is arranged such that the imaginary apex of the first 10 and second 11 frustoconical portions both point in the same axial direction along the rotational axis (X), which in this case is axially down towards the lower axial end 5 of the insert 1.

Figure 4:
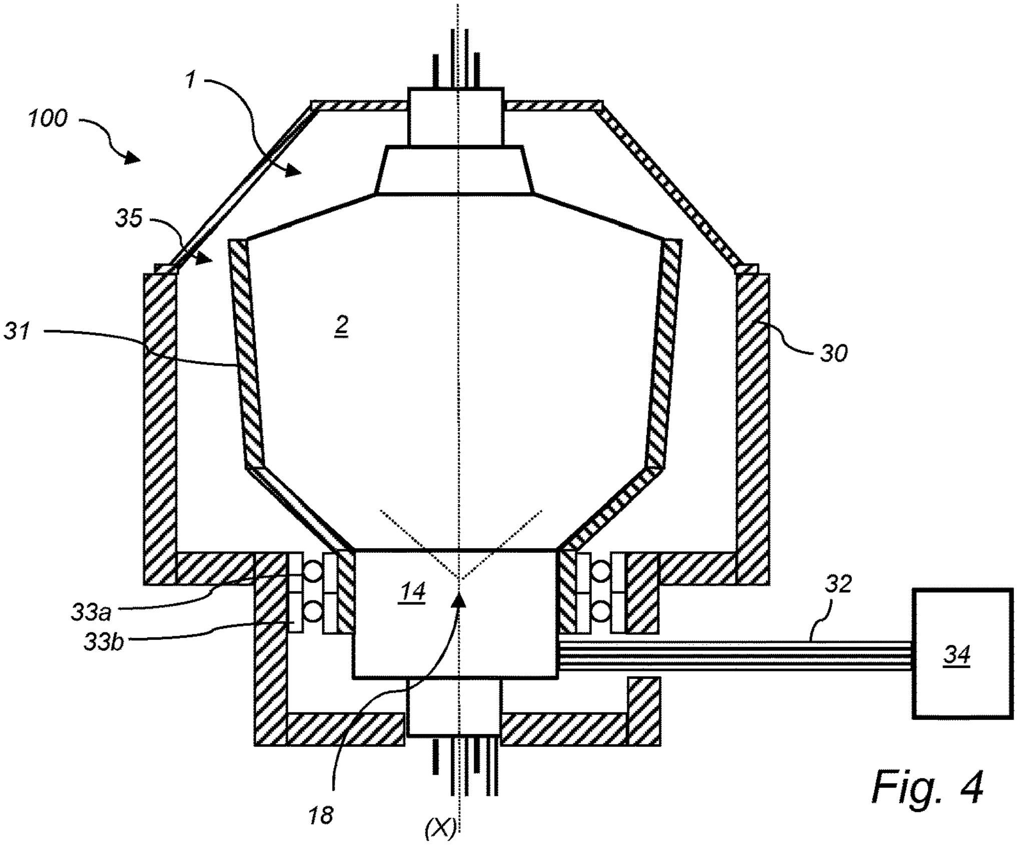

The rotor casing 2 having the two frustoconical portions 10 and 11 with imaginary apexes pointing downwards allows for the insert 1 to be inserted into a rotatable member 31 of a rotatable assembly 35 from above, see FIG. 4. Thus, the shape of the outer surface increases the compatibility with an external rotatable member 31, which may engage the whole, or part of the outer surface of the rotor casing 2, such as engage the first 10 and second 11 frustoconical portions.

There is a lower rotatable seal arranged within lower seal housing 12 which separates the rotor casing 2 from the first stationary portion 3 and an upper rotatable seal arranged within upper seal housing 13 which separates the rotor casing 2 from the second stationary portion 4. The axial position of the sealing interface within the lower seal housing 12 is denoted 15*c*, and the axial position of the sealing interface within the upper seal housing 13 is denoted 16*c*. Thus, the sealing interfaces formed between such stationary part 15*a*, 16*a* and rotatable part 15*b*, 16*b* of the first 15 and second 16 rotatable seals also form the interfaces or border between the rotor casing 2 and the first and second stationary portions 3, 4 of the insert 1, see also FIG. 5.

There are further a seal fluid inlet 15*d* and a seal fluid outlet 15*e* for supplying and withdrawing a seal fluid, such as a cooling liquid, to the first rotatable seal 15 and in analogy, a seal fluid inlet 16*d* and a seal fluid outlet 16*e* for supplying and withdrawing a seal fluid, such as a cooling liquid, to the second rotatable seal 16.

Shown in FIG. 3 is the axial position of the separation space 17 enclosed within the rotor casing 2. See also FIG. 5 wherein is shown a heavy phase collection space 17*c* of the separation space 17 extends from a first, lower, axial position 17*a* to a second, upper, axial position 17*b*. The inner peripheral surface of the separation space 17 may form an angle with the rotational axis (X) that is substantially the same as the angle $\alpha$ between the outer surface of the second frustoconical portion 11 and the rotational axis (X). The inner diameter of the separation space 17 may thus increase continuously from the first axial position 17*a* to the second axial position 17*b*. The angle $\alpha$ may be less than 10 degrees, such as less than 5 degrees.

FIG. 4 shows a schematic drawing of the exchangeable separation insert 1 being inserted within centrifugal separator 100, which comprises a stationary frame 30 and a rotatable member 31 that is supported by the frame by means of supporting means in the form of an upper and lower ball bearing 33*a*, 33*b*. The rotatable assembly 35 of the centrifugal separator 100 comprises the rotatable member 31 and the rotor casing 2 of the insert 1.

There is also a drive unit 34, which in this case is arranged for rotating the rotatable assembly 35 around the rotational axis (X) via drive belt 32. However, other driving means are possible, such as an electrical direct drive.

The exchangeable separation insert 1 is inserted and secured within the rotatable member 31. The rotatable member 31 thus comprises an inner surface for engaging with the outer surface of the rotor casing 2. The upper and lower ball bearings 33*a*, 33*b* are both positioned axially below the separation space 17 within the rotor casing 2 such that a cylindrical portion 14 of the outer surface of the rotor casing 2 is positioned axially at the bearing planes. The cylindrical portion 14 thus facilitates mounting of the insert within at least one large ball bearing.

Further, as seen in FIG. 4, the insert 1 is positioned within rotatable member 31 such that the imaginary apex 18 of the lowermost separation disc is positioned axially at or below at least one bearing plane of the upper and lower ball bearings 33*a*, 33*b*.

Moreover, the separation insert is mounted within the separator 1 such that the axial lower part 5 of the insert 1 is positioned axially below the supporting means, i.e. the upper and lower bearings 33*a*, 33*b*. The rotor casing 2 is in this example arranged to be solely externally supported by the rotatable member 31.

The separation insert 1 is further mounted within the separator 100 to allow easy access to the stationary inlet and outlet conduits 7, 8, 9 at the top and bottom of the insert 1.

Figure 5:
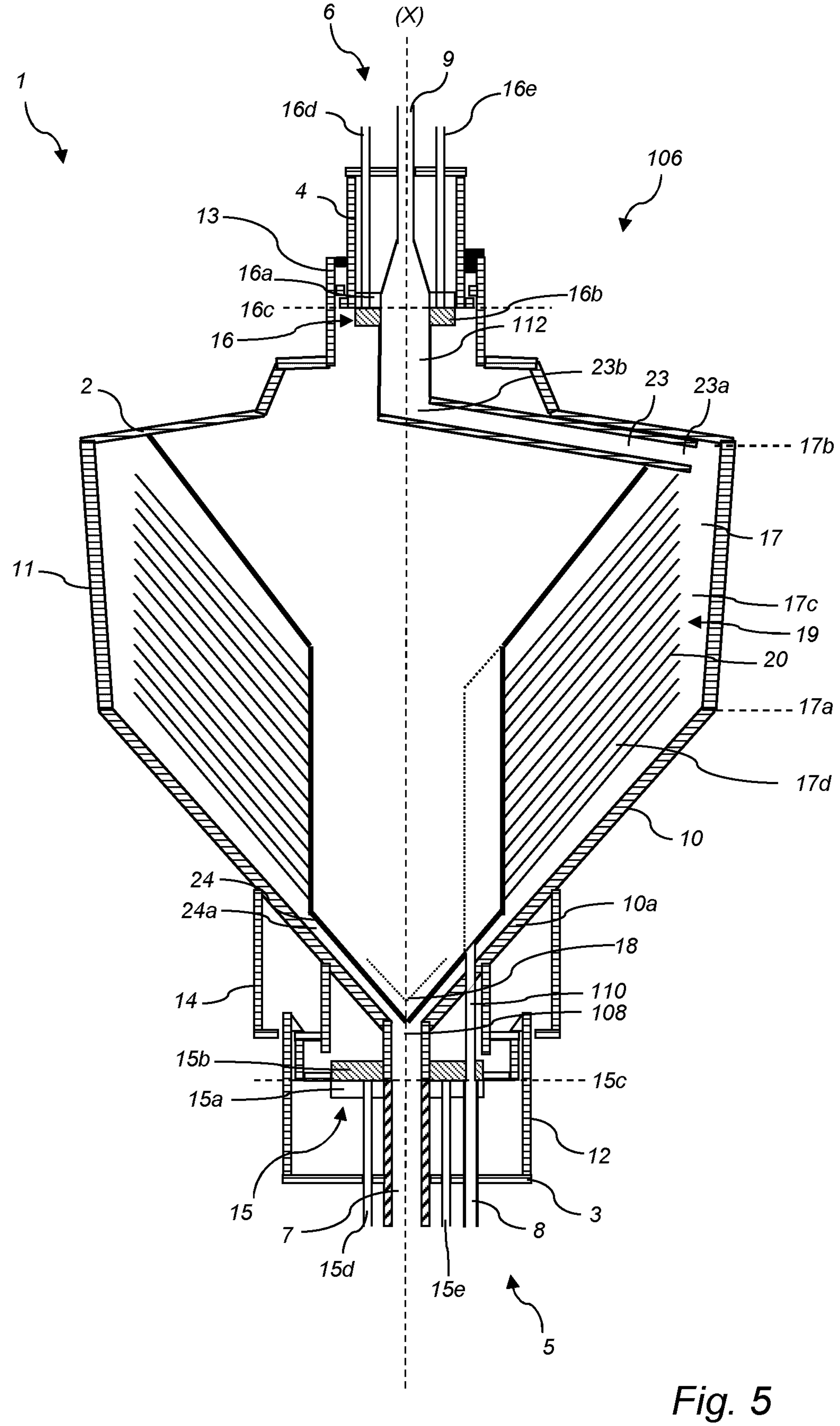

FIG. 5 schematically illustrates a cross-section of an exchangeable separation insert 1 according to embodiments of the present disclosure. The insert 1 comprises a rotor casing 2 arranged to rotate around the rotational axis (X) and arranged between a first, lower stationary portion 3 and a second, upper stationary portion 4. The first stationary portion 3 is thus arranged at the lower axial end 5 of the insert 1, whereas the second stationary portion 4 is arranged at the upper axial end 6 of the insert 1.

The inlet passage 108 to the separation space 17 is in this example arranged at the axial lower end 5, and the feed liquid and the liquid mixture, respectively, are supplied via a stationary inlet conduit 7 arranged in the first stationary portion 3. The stationary inlet conduit 7 may comprise a tubing, such as a plastic tubing.

The inlet passage 108 is arranged for leading the liquid mixture to be separated into the separation space 17. The inlet passage 108 is arranged at the rotational axis (X) such that the liquid mixture to be separated is supplied at the rotational centre and accordingly accelerated in the rotational direction at or close to the rotational axis (X).

The separation space 17 comprises an outer heavy phase collection space 17*c* that extends axially from a first, lower axial position 17*a* to a second, upper axial position 17*b*. The separation space further comprises a radially inner space formed by the interspaces between the separation discs of the stack 19.

A distributor 24 has in this embodiment a conical outer surface with the apex at the rotational axis (X) and pointing toward the lower end 5 of the insert 1. The outer surface of the distributor 24 has the same conical angle as an inlet cone 10*a*. There is further a plurality of distributing channels 24*a* extending along the outer surface for guiding the liquid mixture to be separated continuously axially upwards through the inlet passage 108 to the separation space 17.

There is further a stack 19 of frustoconical separation discs 20 arranged coaxially with the rotational axis (X) in the separation space 17. The separation discs 20 in the stack 19 are arranged with the imaginary apex 18 pointing to the axially lower end 5 of the separation insert, i.e. towards the inlet passage 108. The imaginary apex 18 of the lowermost separation disc in the stack 19 may be arranged at a distance that is less than 10 cm from the first stationary portion 3 in the axial lower end 5 of the insert 1. The stack 19 may comprise at least 20 separation discs 20, such as at least 40 separation discs 20, such as at least 50 separation discs 20, such as at least 100 separation discs 20, such as at least 150 separation discs 20. For clarity reasons, only a few discs are shown in FIG. 5.

In this example, the stack 19 of separation discs 20 is arranged on top of the distributor 24, and the conical outer surface of the distributor 24 may thus have the same angle relative the rotational axis (X) as the conical portion of the frustoconical separation discs 20.

The heavy phase collection space 17*c* of the separation space 17 has in this embodiment an inner diameter that continuously increases from the first, lower axial position 17*a* to the second, upper axial position 17*b*. There is further an outlet conduit 23 for transporting a separated heavy phase from the separation space 17. This conduit 23 extends from a radially outer position of the separation space 17 to the second outlet passage 112. In this example, the conduit 23 is in the form of a single pipe extending from a central position radially out into the separation space 17. However, there may be at least two such outlet conduits 23, such as at least three, such as at least five, outlet conduits 23. The outlet conduit 23 has thus a conduit inlet 23*a* arranged at the radially outer position and a conduit outlet 23*b* at a radially inner position.

The outlet conduit 23 is arranged at an axially upper position in the separation space 17. The outlet conduit 23 further extends radially out into the separation space 17 such that the outlet conduit inlet 23*a* is arranged for transporting separated heavy phase from the periphery of the separation space 17, i.e. from the radially outermost position in the separation space 17.

The conduit outlet 23*b* of the outlet conduit 23 ends is fluidly connected to the second outlet passage 112, which includes a stationary second outlet conduit 9 arranged in the second, upper stationary portion 4. Separated heavy phase is thus discharged via the top, i.e. at the upper axial end 6, of the separation insert 1.

Furthermore, separated liquid light phase, which has passed radially inwards in the separation space 17 through the stack 19 of separation discs 20, is lead out of the separation space 17 via the first outlet passage 110 at the axially lower end 5 of the insert 1.

A stationary first outlet conduit 8 forms part of the first outlet passage 110 and is arranged in the first, lower stationary portion 3 of the insert 1. Thus, separated liquid light phase is discharged via the first, lower, axial end 5 of the exchangeable separation insert 1.

The stationary first outlet conduit 8 arranged in the first stationary portion 3 and the stationary second outlet conduit 9 arranged in the second stationary portion 4 may comprise tubing, such as plastic tubing.

There is provided a lower rotatable seal 15, which separates the rotor casing 2 from the first stationary portion 3, arranged within lower seal housing 12 and an upper rotatable seal 16, which separates the rotor casing from the second stationary portion 4, arranged within upper seal housing 13. The first and second rotatable seals 15, 16 are hermetic seals, thus forming mechanically hermetically sealed inlet and outlet passages 108, 110, 112.

The lower rotatable seal 15 seals and connects both the inlet passage 108 to its stationary inlet conduit 7 and seals and connects the first outlet passage 110 to its stationary first outlet conduit 8. The lower rotatable 15 seal thus forms a concentric double mechanical seal, which allows for easy assembly with few parts. The lower rotatable seal 15 comprises a stationary part 15*a* arranged in the first stationary portion 3 of the insert 1 and a rotatable part 15*b* arranged in the axially lower portion of the rotor casing 2. The rotatable part 15*b* is in this embodiment a rotatable sealing ring arranged in the rotor casing 2 and the stationary part 15*a* is a stationary sealing ring arranged in the first stationary portion 3 of the insert 1. There are further means (not shown), such as at least one spring, for bringing the rotatable sealing ring and the stationary sealing ring into engagement with each other, thereby forming at least one sealing interface 15*c* between the rings. The formed sealing interface extends substantially in parallel with a radial plane with respect to the rotational axis (X). This sealing interface 15*c* thus forms the border or interface between the rotor casing 2 and the first stationary portion 3 of the insert 1. There are further connections 15*d* and 15*e* arranged in the first stationary portion 3 for supplying a liquid, such as a cooling liquid, buffer liquid or barrier liquid, to the lower rotatable seal 15. This liquid may be supplied to the interface 15*c* between the sealing rings.

In analogy, the upper rotatable seal 16 seals and connects the second outlet passage 112 to its stationary second outlet conduit 9. The upper rotatable seal 16 may also be a mechanical seal. The upper rotatable seal 16 comprises a stationary part 16*a* arranged in the second stationary portion 4 of the insert 1 and a rotatable part 16*b* arranged in the axially upper portion of the rotor casing 2. The rotatable part 16*b* is in this embodiment a rotatable sealing ring arranged in the rotor casing 2 and the stationary part 16*a* is a stationary sealing ring arranged in the second stationary portion 4 of the insert 1. There are further means (not shown), such as at least one spring, for bringing the rotatable sealing ring and the stationary sealing ring into engagement with each other, thereby forming at least one sealing interface 16*c* between the rings. The formed sealing interface 16*c* extends substantially in parallel with a radial plane with respect to the rotational axis (X). This sealing interface 16*c* thus forms the border or interface between the rotor casing 2 and the second stationary portion 4 of the insert 1. There are further connections 16*d* and 16*e* arranged in the second stationary portion 4 for supplying a liquid, such as a cooling liquid, buffer liquid or barrier liquid, to the upper rotatable seal 16. This liquid may be supplied to the interface 16*c* between the sealing rings.

The lower and upper rotatable seals 15, 16 are mechanical seals, hermetically sealing the inlet passage 108 and the two outlet passages 110, 112.

With reference to FIGS. 3-5, during operation, the rotatable assembly 35 i.e., the exchangeable separation insert 1, inserted into a rotatable member 31, is brought into rotation around rotational axis (X). Liquid mixture to be separated is supplied via the inlet passage 108 and is then guided by the distributing channels 24*a* of the distributor 24 to the separation space 17. Thus, the liquid mixture to be separated is guided solely along an upwards path from the inlet conduit 7 to the separation space 17. Due to a density difference, the liquid mixture is separated into the light and heavy phases. This separation is facilitated by the interspaces between the separation discs 20 of the stack 19 fitted in the separation space 17. The separated liquid heavy phase is collected from the periphery of the separation space 17 by outlet conduit 23 and is lead out of the rotor casing 2 via the second outlet passage 112 arranged at the rotational axis (X). Separated liquid light phase passes radially inwards through the stack 19 of separation discs 20 and is led via the first outlet passage 110 out of the rotor casing 2.

During deaerating and during determining whether gas is present in the fluid system 106 instead, a feed liquid other than the liquid mixture may be used and lead from the inlet passage 108 via the separation space 17 to the first and second outlet passages 110, 112. The rotatable assembly 35 may be at standstill and/or may be rotated during deaerating and/or determining whether gas is present in the fluid system 106. As discussed herein, the first and second outlet passages 110, 112 may be closed during the determining whether gas is present in the fluid system 106.

Consequently, in this embodiment, the feed is supplied via the lower axial end 5, the separated light phase is discharged via the lower axial end 5, whereas the separated heavy phase is discharged via the upper axial end 6.

A fluid system 106 of the centrifugal separator 100 comprises the separation space 17, the inlet passage 108 into the separation space 17, and a first outlet passage 110 and a second outlet passage 112 from the separation space 17. The fluid system 106 may be limited by a feed pump connected to the inlet passage 108, a first regulating device connected to the first outlet passage 110, and a second regulating device connected to the second outlet passage 112, as discussed above with reference to FIG. 1.

The methods of the present disclosure may also be performed in a centrifugal separator in which the rotatable assembly does not comprise a single use insert. In embodiments, the rotatable assembly comprises a spindle arranged to rotate coaxially with the rotor casing and the spindle may rotatably supported by the stationary frame via at least one bearing.

Thus, the rotor casing may be arranged at an end of a rotatable spindle, and this spindle may be supported in the frame by at least one bearing device, such as by at least one ball-bearing.

As an example, said spindle may comprise a central duct arranged around the rotational axis (X) and forming part of the inlet passage, and said first rotatable seal may be sealing and connecting said central duct to said stationary inlet conduit.

Thus, the spindle may be a hollow spindle and may be used for supplying liquid mixture to the inlet. The spindle may further comprise an outer annular duct for discharging a separated liquid phase, such as the separated liquid light phase.

Figure 6:
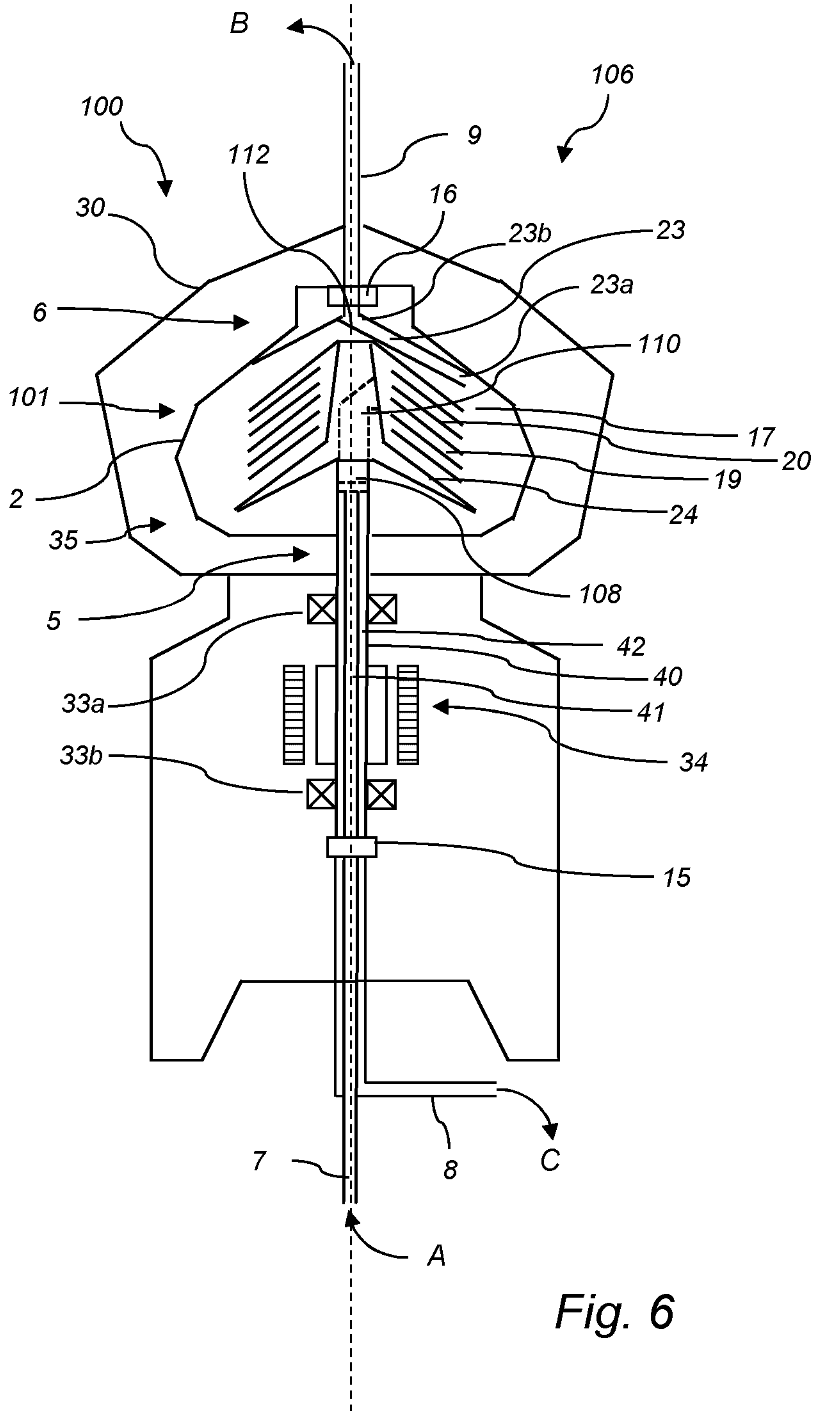

FIG. 6 shows in more detail a centrifugal separator 100 in which the rotatable assembly 35 comprises a rotatable hollow spindle 40 and a rotor casing 2. The separator 100 comprises a frame 30, the hollow spindle 40, which is rotatably supported by the frame 30 in a bottom bearing **33*b* and a top bearing 33*a*, and the rotor casing 2. The rotor casing 2 is adjoined to the axially upper end of the spindle 40 to rotate together with the spindle 40** around the rotational axis (X).

The rotor casing 2 encloses a separation space 17 in which a stack 19 of separation discs 20 is arranged in order to achieve effective separation of a liquid mixture, such as a cell culture mixture, that is processed. An inlet passage 108 leads to the separation space 17. The separation discs 20 of the stack 19 have a frustoconical shape with the imaginary apex pointing axially downwards and are examples of surface-enlarging inserts or separation aids. The stack 19 is fitted centrally and coaxially with the rotor casing 2. In FIG. 6, only a few separation discs are shown. The stack 19 may for example contain more than 100 separation discs 20, such as more than 200 separation discs 20.

The rotor casing 2 has a mechanically hermetically sealed first outlet passage 110 for discharge of a separated liquid light phase, and a second outlet passage 112 for discharge of a separated heavy phase.

In case of a cell culture mixture, the liquid light phase may thus contain an extracellular biomolecule that has been expressed by the cells during fermentation and the separated heavy phase may be a separated cell containing phase.

There is a single outlet conduit 23 in the form of a pipe for transporting separated heavy phase from the separation space 17. This conduit 23 extends from a radially outer position of the separation space 17 to the second outlet passage 112. The conduit 23 has a conduit inlet **23*a* arranged at the radially outer position and a conduit outlet 23*b*** arranged at a radially inner position.

Also, the inlet passage 108 is mechanically hermetically sealed. The inlet passage 108 is in this embodiment connected to central duct 41 extending through the spindle 40, which thus takes the form of a hollow, tubular member. Introducing the liquid mixture from the bottom of the spindle 40 provides a gentle acceleration of the liquid mixture. The spindle 40 is further connected to a stationary inlet pipe 7 at the bottom axial end of the separator 100 via a hermetic seal 15, such that the liquid mixture to be separated may be transported to the central duct 41, e.g. by means of a feed pump.

The separated liquid light phase is in this embodiment discharged via an outer annular duct 42 in said spindle 40. Consequently, the separated liquid phase of lower density is discharged via a bottom portion of the separator 100.

A first mechanical hermetical seal 15 is arranged at the bottom end to seal the hollow spindle 40 to the stationary inlet pipe 7. The first hermetic seal 15 is an annular seal that surrounds the bottom end of the spindle 40 and the stationary pipe 7. The first hermetic seal 15 is a concentric double seal that seals both the rotatable portion of the inlet passage 108 to its stationary inlet pipe 7 and the rotatable portion of the first outlet passage 110 to its stationary outlet pipe 8. A second mechanical hermetical seal 16 that seals the rotating portion of the second outlet passage 112 its stationary outlet pipe 9 at the top portion of the separator 100.

As seen in FIG. 6, the inlet passage 108, and the second outlet passage 112 as well as the stationary outlet pipe 9 for discharging separated cell phase are all arranged along rotational axis (X) such that liquid mixture to be separated enters the rotor casing 2 at the rotational axis (X), as indicated by arrow "A", and the separated heavy phase is discharged at the rotational axis (X), as indicated by arrow "B". The discharged liquid light phase is discharged at the bottom end of the centrifugal separator 100, as illustrated by arrow "C".

A fluid system 106 of the centrifugal separator 100 comprises the separation space 17, the inlet passage 108 into the separation space 17, and a first outlet passage 110 and a second outlet passage 112 from the separation space 17. The fluid system 106 may be limited by a feed pump connected to the inlet passage 108, a first regulating device connected to the first outlet passage 110, and a second regulating device connected to the second outlet passage 112, as discussed above with reference to FIG. 1.

The centrifugal separator 100 is further provided with a drive unit 34. The drive unit 34 comprises an electric motor 34 and may for example comprise a stationary element and a rotatable element, which rotatable element surrounds and is connected to the spindle 40 such that it transmits driving torque to the spindle 40 and hence to the rotor casing 2 during operation. Alternatively, an electric motor may be connected to the spindle 40 by transmission means. The transmission means may be in the form of a worm gear which comprises a pinion and an element connected to the spindle 40. The transmission means may alternatively take the form of a propeller shaft, drive belts or the like, and the electric motor may alternatively be connected directly to the spindle 40.

During operation of the separator in FIG. 6, the rotatable assembly 35 and thus rotor casing 2 are caused to rotate by torque transmitted from the drive unit 34 to the spindle 40. Via the central duct 41 of the spindle 40, liquid mixture to be separated is brought into the separation space 17 via the inlet passage 108. The inlet passage 108 and the stack 19 of separation discs 20 are arranged such that the liquid mixture enters the separation space 17 at a radial position that is at, close to, or radially outside, the outer radius of the stack 19 of separation discs 20.

Alternatively, the distributor 24 may be arranged to supply the liquid mixture to be separated to the separation space 17 at a radial position that is within the stack 19 of separation discs 20, e.g. by axial distribution openings in the distributor 24 and/or the stack 19 of separation discs 20. Such openings may form axial distribution channels within the stack 19.

In the hermetic type of inlet passage 108, the acceleration of the liquid mixture is initiated at a small radius and is gradually increased while the liquid leaves the inlet passage 108 and enters the separation space 17.

The separation space 17 is intended to be completely filled with liquid during operation. This means that no gas or free liquid surfaces is present within the fluid system 106 of the centrifugal separator 100.

Figure 7A:
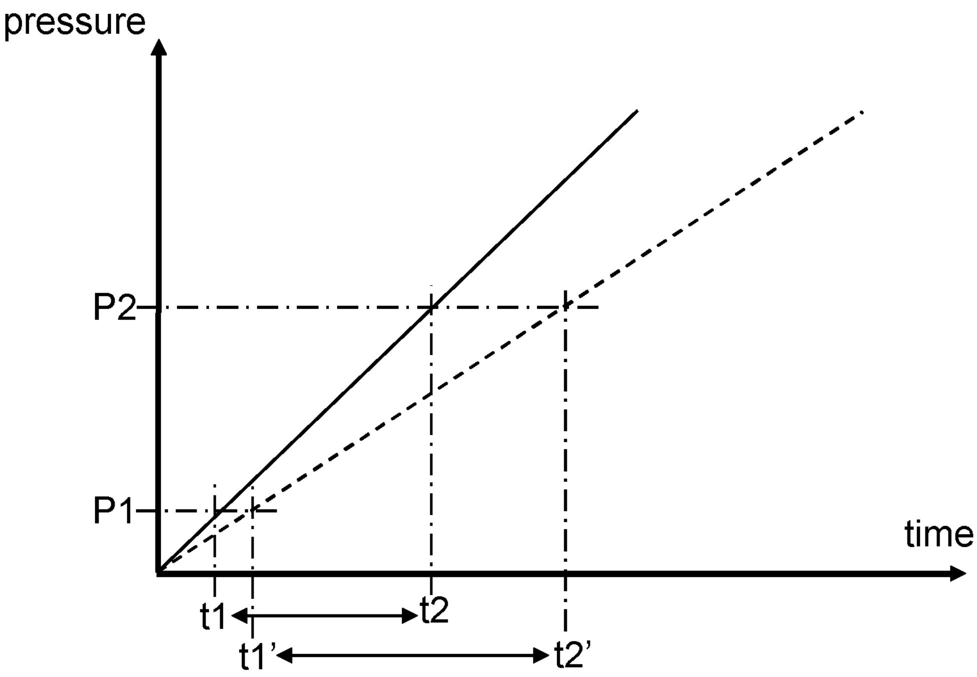
FIGS. 7*a* and 7*b* show respective diagrams of pressure increase over time in a fluid system of a centrifugal separator.
Figure 7B:
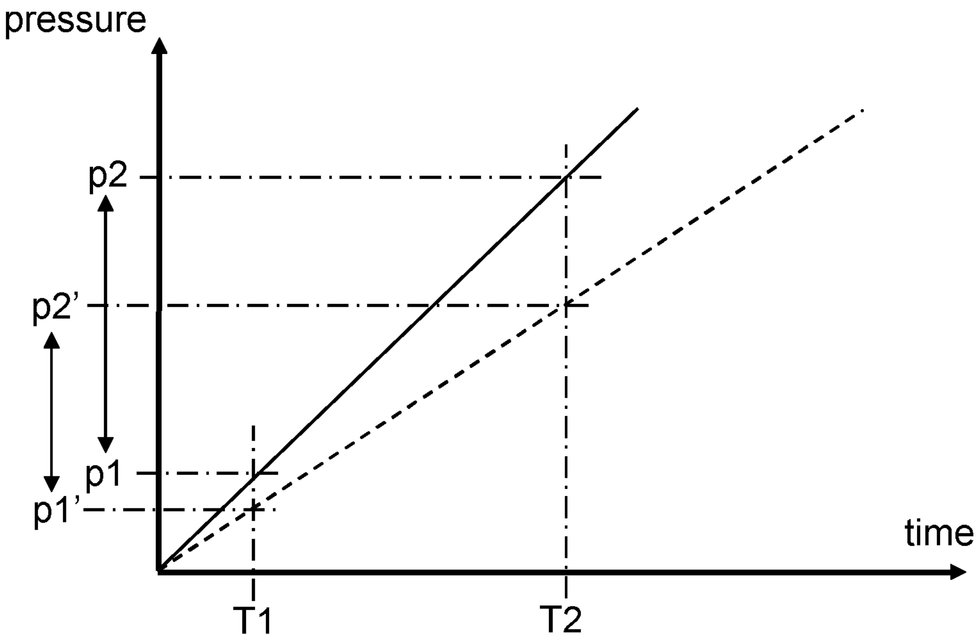

FIGS. 7*a* and 7*b* show respective diagrams of pressure increase over time in a fluid system of a centrifugal separator. The fluid system may be a fluid system 106 of a centrifugal separator 100 as discussed herein. Accordingly, in the following reference is also made to FIGS. 1-6.

More specifically, in FIGS. 7*a* and 7*b* two different pressure increases in the fluid system 106 are shown with b) the inlet passage 108 and all outlet passages 110, 112 closed while, c) supplying further feed liquid to the inlet passage 108, as inter alia discussed with reference to the separation system 102 and the control arrangement 104 and FIGS. 1 and 2 and the method 200 and FIG. 8.

The full line represents an example of a pressure increase in the fluid system 106 when there is not gas/air present in the fluid system 106. The broken line represents an example of a pressure increase in the fluid system 106 when there is gas/air present in the fluid system 106.

Generally, when there is no gas in the fluid system 106, the pressure increase is steeper than when there is gas present in the fluid system 106. The more gas in the fluid system 106, the less steep the pressure increase and the less steep a line representing the pressure increase in the diagrams of FIGS. 7*a* and 7*b*.

According to some embodiments, illustrated in FIG. 7*a*, it may be determined whether gas is present in the fluid system 106 based on a length of a measured time period, dT, such as from t1 to t2 or t1' to t2', required for establishing a predetermined pressure increase interval, such as from P1 to P2.

If the length of the time period dT, exceeds a predetermined length, Tpre, then a presence of gas in the fluid system 106 is determined. If the length of the time period dT is below the predetermined length Tpre, then an absence of gas in the fluid system 106 is determined.

In the example of FIG. 7*a*, this may be expressed as:

If $dT > T\text{pre}$=presence of gas i.e., $t2'-t1' > T\text{pre}$=presence of gas.

If $dT < T\text{pre}$=absence of gas i.e., $t2-t1 < T\text{pre}$=absence of gas

According to some embodiments, illustrated in FIG. 7*b*, it may be determining whether gas is present in the fluid system 106 based on a result of the measuring of a value of the pressure increase interval, dP, such as from p1 to p2 or p1' to p2', over a fixed time period such as T1 to T2.

If the value of the pressure increase interval dP is below a predetermined value, Ppre, presence of gas in the fluid system 106 is determined. If the value of the pressure increase interval dP exceeds the predetermined value Ppre, absence of gas in the fluid system 106 is determined.

In the example of FIG. 7*b*, this may be expressed as:

If $dP < P\text{pre}$=presence of gas i.e., $p2'-1' < P\text{pre}$=presence of gas.

If $dP > P\text{pre}$=absence of gas i.e., $p2-p1 > P\text{pre}$=absence of gas

Figure 8:
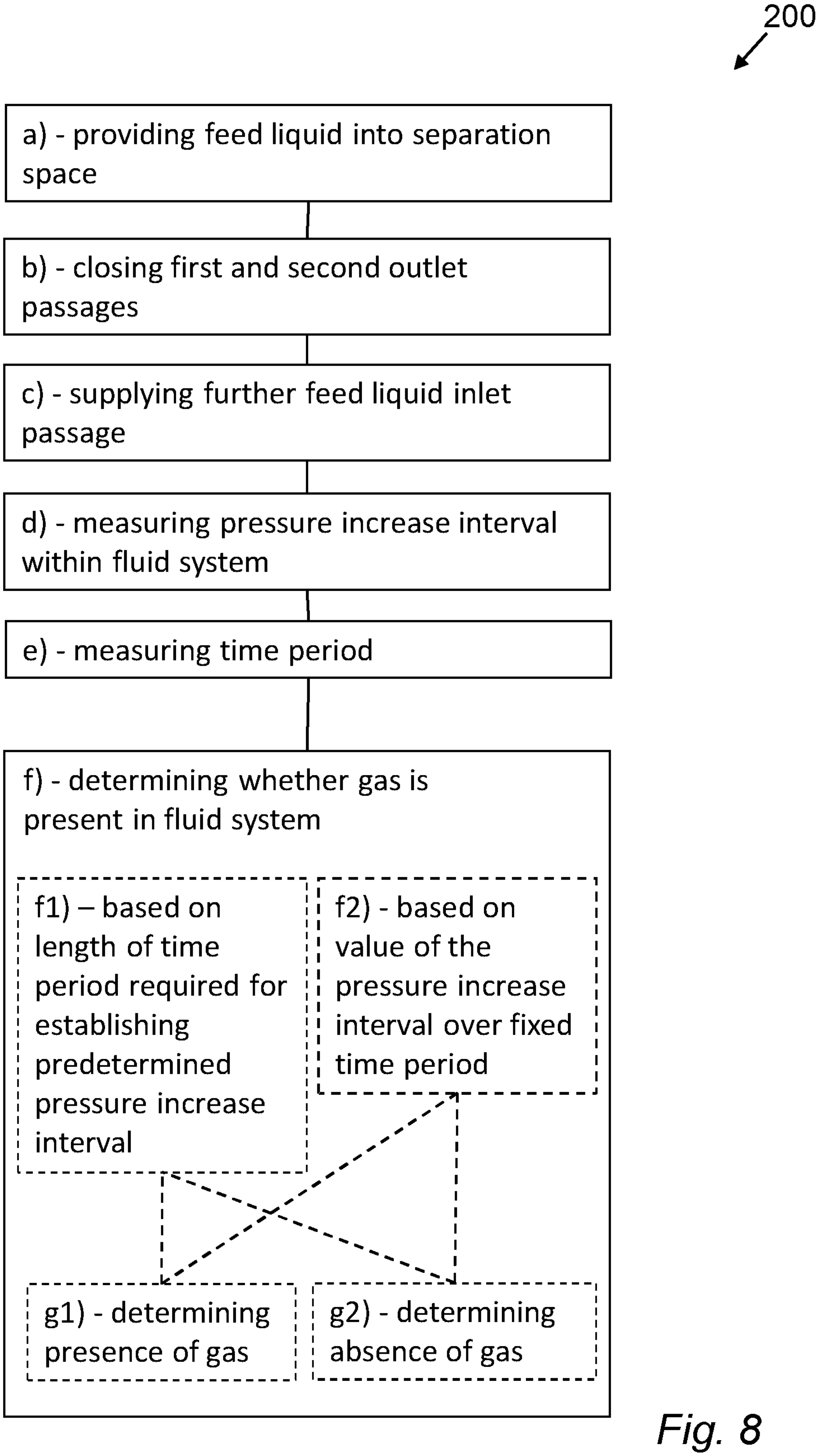
FIG. 8 illustrates embodiments of a method for determining gas presence in a fluid system of a centrifugal separator.

FIG. 8 illustrates embodiments of a method 200 for determining gas presence in a fluid system of a centrifugal separator. Execution of the method 200 may be controlled by a control arrangement 104 as discussed above with reference to FIGS. 1 and 2. In the following, reference is also made to FIGS. 1-3.

The method 200 may be applied in a centrifugal separator 100 of a separation system 102 as discussed above with reference to FIGS. 1-6. The centrifugal separator may be a centrifugal separator 100 as discussed above with reference to FIGS. 1-7*b*. Accordingly, the centrifugal separator 100 comprises a stationary frame 30, a rotatable assembly 35, and a drive unit 34 for rotating the rotatable assembly 35 around a rotational axis (X). Also, the fluid system 106 of the centrifugal separator 100 comprises a separation space 17 in the rotatable assembly 35, an inlet passage 108 into the separation space 17, and at least a first outlet passage 110 from the separation space 17.

The method 200 comprises steps of:

a) providing a feed liquid into the separation space 17,
b) closing all outlet passages 110, 112 from the separation space 17,
c) supplying further feed liquid to the inlet passage 108,
d) measuring a pressure increase interval within the fluid system 106,
e) measuring a time period, and
f) determining whether gas is present in the fluid system 106 based on a result of the measuring in steps d) and e).

According to some embodiments, the step f) may comprise a step of:

f1) determining whether gas is present in the fluid system based on a result of the measuring of a length of the time period, in accordance with step e), required for establishing a predetermined pressure increase interval, determined in the measuring in accordance with step d).

The presence of gas in the fluid system 106 may be determined in relation to a predetermined length of the time period.

Accordingly, if the length of the time period exceeds a predetermined length, then step f1) may comprise g1) determining presence of gas in the fluid system, and wherein if the length of the time period equals or is below the predetermined length, then step f1) may comprise g2) determining absence of gas in the fluid system.

The predetermined length of the time period may be determined for each particular separation system 102 and may be one established predetermined length time period. Alternatively, the predetermined length time period may be one or more time period lengths established in repeated measurements with a deaeration in between the individual measurements. For instance, if three measurements in a row provide the same time period length with deaeration between each measurement, absence of gas may be determined.

In alternative embodiments, the step f) may comprise a step of:

f2) determining whether gas is present in the fluid system is based on a result of the measuring of a value of the pressure increase interval, in accordance with step d) over a fixed time period measured in accordance with step e).

The presence of gas in the fluid system 106 may be determined in relation to a predetermined value of the pressure increase interval.

Accordingly, if the value of the pressure increase interval is below a predetermined value, then step f2) may comprise g1) determining presence of gas in the fluid system, and wherein if the value of the pressure increase interval exceeds the predetermined value, then step f2) may comprise g2) determining absence of gas in the fluid system.

The predetermined value of the pressure increase interval may be determined for each particular separation system 102.

The step c) supplying further feed liquid may comprise pumping further feed liquid into the inlet passage 108.

The feed pump 61 may pump the feed liquid in step c) into the inlet passage 108. The feed pump 61 may be controlled by the control unit 50 to provide specific operating conditions, such as e.g. a constant rotational speed. In this manner, the pumping of feed liquid in step c) is repeatable and provides conditions for the measuring in steps d) and e) to be performed under the same conditions every time the method 200 is performed.

According to embodiments, the inlet passage 108 and the at least first outlet passage 110, 112 may be mechanically hermetically sealed. In this manner, when all outlet passages are closed in step b) and the further feed liquid is supplied in step c), it may be ensured that the pressure in the fluid system 106 increases and can be measured in accordance with step d).

According to embodiments, the method 200 for determining gas presence in a fluid system 106 of a centrifugal separator 100 may be performed during standstill of the rotatable assembly 35.

According to alternative embodiments, the method 200 for determining gas presence in a fluid system 106 of a centrifugal separator 100 may be performed during rotation of the rotatable assembly 35.

According to a further aspect, there is provided a computer program comprising instructions which, when the program is executed by a computer, causes the computer to carry out a method 200 according to any one of aspects and/or embodiments discussed herein.

One skilled in the art will appreciate that the method 200 for determining gas presence in a fluid system 106 of a centrifugal separator 100 may be implemented by programmed instructions. These programmed instructions are typically constituted by a computer program, which, when it is executed in a computer or control unit 50, ensures that the computer or control unit 50 control carries out the desired control, such as the method steps a)-g2) according to the invention.

The computer program may be part of a computer-readable storage medium which comprises a suitable digital storage medium on which the computer program is stored.

A computer-readable storage medium may comprise instructions which, when executed by a computer or control unit 50, cause the computer or control unit 50 to control carry out the steps of the method 200 according to any one of aspects and/or embodiments discussed herein.

Figure 9:
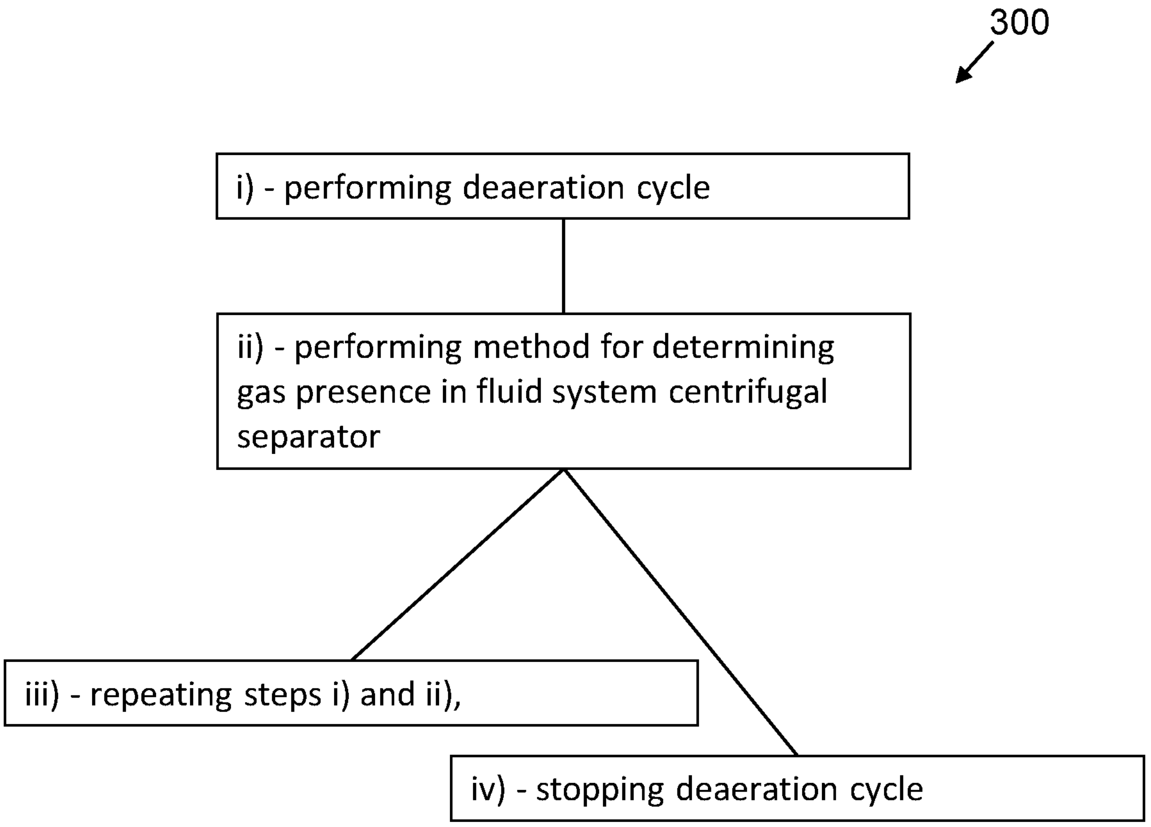
FIG. 9 illustrates embodiments of a method for deaerating a centrifugal separator.

FIG. 9 illustrates embodiments of a method 300 for deaerating a centrifugal separator. Execution of the method 300 may be controlled by a control arrangement 104 as discussed above with reference to FIGS. 1 and 2. In the following, reference is also made to FIGS. 1-6.

The method 300 may be applied in a centrifugal separator 100 of a separation system 102 as discussed above with reference to FIGS. 1-6. The centrifugal separator may be a centrifugal separator 100 as discussed above with reference to FIGS. 1-7*b*. A method 200 for determining gas presence in a fluid system of a centrifugal separator as discussed above with reference to FIG. 8 may be applied.

The method 300 for deaerating a centrifugal separator 100 comprises steps of:

i) performing a deaeration cycle of the centrifugal separator 100, ii) performing the method 200 for determining gas presence in a fluid system 106 of the centrifugal separator 100 according to any one of aspects and/or embodiments discussed herein, and either if step ii) comprises a result indicating gas presence in the fluid system 106, iii) repeating steps i) and ii), or if step ii) comprises a result indicating absence of gas in the fluid system 106, iv) stopping the deaeration cycle based on information obtained in step ii).

The method 300 for deaerating may be performed at standstill of the centrifugal separator or alternatively, as the rotatable assembly of the centrifugal separator 100 rotates.

In embodiments of the method 300, the deaeration cycle of step i) may comprise rotating the rotatable assembly of the centrifugal separator and increasing and decreasing the rotational speed of the rotatable assembly while no feed is supplied to the separator.

According to a further aspect, there is provided a computer program comprising instructions which, when the program is executed by a computer, causes the computer to control carry out a method 300 according to any one of aspects and/or embodiments discussed herein.

One skilled in the art will appreciate that the method 300 for deaerating a centrifugal separator 100 may be implemented by programmed instructions. These programmed instructions are typically constituted by a computer program, which, when it is executed in a computer or control unit 50, ensures that the computer or control unit 50 control carries out the desired control, such as the method steps i)-iv) according to the invention.

The computer program may be part of a computer-readable storage medium which comprises a suitable digital storage medium on which the computer program is stored.

A computer-readable storage medium may comprise instructions which, when executed by a computer or control unit 50, cause the computer or control unit 50 to control carry out the steps of the method 300 according to any one of aspects and/or embodiments discussed herein.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A method for determining gas presence in a fluid system of a centrifugal separator, the centrifugal separator comprising a stationary frame, a rotatable assembly, and a drive unit for rotating the rotatable assembly around a rotational axis, and wherein the fluid system comprises a separation space in the rotatable assembly, an inlet passage into the separation space, and at least a first outlet passage from the separation space, the method comprising steps of:

a) providing a feed liquid into the separation space;

b) closing all outlet passages from the separation space;

c) supplying further feed liquid to the inlet passage;

d) measuring a pressure increase interval within the fluid system;

e) measuring a time period; and f) determining whether gas is present in the fluid system based on a result of the measuring in steps d) and e).

2. The method according to claim 1, wherein the step f) comprises a step of:

f1) determining whether gas is present in the fluid system based on a result of the measuring of a length of the time period, in accordance with step e), required for establishing a predetermined pressure increase interval, determined in the measuring in accordance with step d).

3. The method according to claim 2, wherein if the length of the time period exceeds a predetermined length, then step f1) comprises determining presence of gas in the fluid system, and wherein if the length of the time period is below the predetermined length, then step f1) comprises determining absence of gas in the fluid system.

4. The method according to claim 1, wherein the step f) comprises a step of:

f2) determining whether gas is present in the fluid system is based on a result of the measuring of a value of the pressure increase interval, in accordance with step d) over a fixed time period measured in accordance with step e).

5. The method according to claim 4, wherein if the value of the pressure increase interval is below a predetermined value, then step f2) comprises determining presence of gas in the fluid system, and wherein if the value of the pressure increase interval exceeds the predetermined value, then step f2) comprises determining absence of gas in the fluid system.

6. The method according to claim 1, wherein the supplying of step c) comprises pumping further feed liquid into the inlet passage.

7. The method according to claim 1, wherein the centrifugal separator is free of any deaeration channels arranged for leading out gas from the inlet passage to outside the rotatable assembly or to the at least first outlet passage.

8. The method according to claim 1, wherein the fluid system comprises a second outlet passage from the separation space, wherein the inlet passage is configured for supply of a liquid mixture to be separated, the first outlet passage is configured for discharge of a separated liquid phase, and the second outlet passage is configured for discharge of a heavy phase having a density that is higher than the separated liquid phase, and wherein the rotatable assembly comprises a rotor casing enclosing the separation space and a stack of separation discs arranged in the separation space.

9. The method according to claim 8, wherein the rotatable assembly comprises an exchangeable separation insert and a rotatable member, the exchangeable separation insert comprising the rotor casing and being supported by the rotatable member.

10. The method according to claim 1, wherein the inlet passage and the at least first outlet passage are mechanically hermetically sealed.

11. The method according to claim 1, wherein the method is performed during standstill of the rotatable assembly.

12. The method according to claim 2, wherein the supplying of step c) comprises pumping further feed liquid into the inlet passage.

13. The method according to claim 3, wherein the supplying of step c) comprises pumping further feed liquid into the inlet passage.

14. The method according to claim 4, wherein the supplying of step c) comprises pumping further feed liquid into the inlet passage.

15. A method for deaerating a centrifugal separator comprising steps of:

i) performing a deaeration cycle of the centrifugal separator;

ii) performing the method for determining gas presence in a fluid system of the centrifugal separator according to claim 1; and either if step ii) comprises a result indicating gas presence in the fluid system, iii) repeating steps i) and ii), or if step ii) comprises a result indicating absence of gas in the fluid system, iv) stopping the deaeration cycle based on information obtained in step ii).

16. A separation system comprising a centrifugal separator and a control arrangement, wherein the centrifugal separator comprises a stationary frame, a rotatable assembly, a drive unit for rotating the rotatable assembly around a rotational axis, and a fluid system, wherein the fluid system comprises a separation space in the rotatable assembly, an inlet passage into the separation space, and at least a first outlet passage from the separation space, wherein the control arrangement comprises a control unit, a feed pump connected to the inlet passage, at least a first regulating device connected at least to the first outlet passage, a pressure sensor arranged in fluid communication with the fluid system, and a timer, and wherein the control arrangement is configured to:

a) provide a feed liquid into the separation space utilising the feed pump;

b) close all outlet passages utilising at least the first regulating device;

c) supply further feed liquid to the inlet passage utilising the feed pump;

d) measure a pressure increase interval within the fluid system utilising the pressure sensor;

e) measure a time period utilising the timer; and f) determine whether gas is present in the fluid system based on the measured pressure increase interval and the measured time period.

17. The separation system according to claim 16, wherein the fluid system comprises a second outlet passage from the separation space, wherein the control arrangement comprises a second regulating device connected to the second outlet passage, and wherein the control arrangement is further configured to:

b1) close the first and second outlet passages utilising the first and second regulating devices, respectively.

18. The separation system according to claim 17, wherein the inlet passage is configured for supply of a liquid mixture to be separated, the first outlet passage is configured for discharge of a separated liquid phase, and the second outlet passage is configured for discharge of a heavy phase having a density that is higher than the separated liquid phase, and wherein the rotatable assembly comprises a rotor casing enclosing the separation space and a stack of separation discs arranged in the separation space.

19. The separation system according to claim 16, wherein the rotatable assembly comprises an exchangeable separation insert and a rotatable member, the exchangeable separation insert comprising the rotor casing and being supported by the rotatable member.

20. The separation system according to claim 16, wherein the inlet passage and the at least first outlet passage are mechanically hermetically sealed.

* * * * *